(12) United States Patent
Rong et al.

(10) Patent No.: US 9,215,651 B2
(45) Date of Patent: Dec. 15, 2015

(54) METHOD, APPARATUS, AND SYSTEM FOR SELECTING SERVING NODES FOR ACCESS

(71) Applicant: Huawei Technologies Co., Ltd., Shenzhen (CN)

(72) Inventors: Lu Rong, Shenzhen (CN); Yinggang Du, Shenzhen (CN); Jianjun Wu, Shenzhen (CN); Yungang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 13/683,710

(22) Filed: Nov. 21, 2012

(65) Prior Publication Data

US 2013/0083759 A1     Apr. 4, 2013

Related U.S. Application Data

(63) Continuation of application No. PCT/CN2011/084662, filed on Dec. 26, 2011.

(30) Foreign Application Priority Data

Dec. 31, 2010   (CN) .......................... 2010 1 0624685
Jun. 30, 2011   (CN) .......................... 2011 1 0182150

(51) Int. Cl.
*H04W 48/20*     (2009.01)
*H04W 84/04*     (2009.01)

(52) U.S. Cl.
CPC ............ *H04W 48/20* (2013.01); *H04W 84/045* (2013.01)

(58) Field of Classification Search
None
See application file for complete search history.

(56) References Cited

U.S. PATENT DOCUMENTS

| 2005/0174954 | A1 | 8/2005 | Yun et al. |
| 2007/0047512 | A1 | 3/2007 | Zhang et al. |
| 2009/0197603 | A1 | 8/2009 | Ji et al. |
| 2011/0223900 | A1* | 9/2011 | Yu et al. ............... 455/422.1 |

FOREIGN PATENT DOCUMENTS

| CN | 101527936 A | 9/2009 |
| CN | 101547512 A | 9/2009 |

(Continued)

OTHER PUBLICATIONS

Extended European Search Report issued in corresponding European Patent Application No. 11854078.0, mailed Jul. 22, 2013, 17 pages.

(Continued)

*Primary Examiner* — Huy D Vu
*Assistant Examiner* — Teisha D Hall
(74) *Attorney, Agent, or Firm* — Brinks Gilson & Lione

(57) ABSTRACT

Embodiments of the present invention provide a method, an apparatus, and a system for selecting serving nodes for access, where the method includes: obtaining reference signal received parameters of at least two nodes; selecting a downlink serving node from the at least two nodes according to the reference signal received parameter of each node; and sending an uplink signal, so that the downlink serving node selects an uplink serving node from the at least two nodes according to the uplink signal; or, selecting an uplink serving node from the at least two nodes according to the reference signal received parameter of each node, and sending an uplink signal. In the embodiments of the present invention, a user equipment selects a downlink serving node from at least two nodes according to the reference signal received parameter of each node; then the user equipment sends an uplink signal.

37 Claims, 9 Drawing Sheets

(56) References Cited

FOREIGN PATENT DOCUMENTS

| EP | 2375809 A1 | 10/2011 |
| WO | WO 2010/075717 A1 | 7/2010 |

OTHER PUBLICATIONS

Written Opinion of the International Searching Authority issued in corresponding PCT Patent Application No. PCT/CN2011/084662, mailed Apr. 5, 2012, 6 pages.

Change Request, "Alignment to the Stage3 Specification" 36.300 CR xxxx, rev X, Current version: 8.9.0. 3GPP TSG-RAN WG2 #66bis, Jun. 29-Jul. 3, 2009, R2-094114, 3 pages.

CHTTL, "Effect of Rang Expansion in Macro-Pico Downlink" Agenda Item 6.8.1.2, 3GPP TSG-RAN WG1 #62bis meeting. Xian, China, Oct. 11-15, 2010, R1-105690, 6 pages.

Ericsson, "Addition and Correction of X2 Procedures in Stage 2 Specification" Change Request, 36.00 CR rev 1 Current Version 8.7.0. 3GPP TSG-RAN3 Meeting #63. Athens, Greece, Feb. 9-13, 2009, R3-090558, 7 pages.

International Search Report issued in corresponding PCT Patent Application No. PCT/CN2011/084662, mailed Apr. 5, 2012.

\* cited by examiner

METHOD, APPARATUS, AND SYSTEM FOR SELECTING SERVING NODES FOR ACCESS

CROSS-REFERENCE TO RELATED APPLICATIONS

This application is a continuation of International Application No. PCT/CN2011/084662, filed on Dec. 26, 2011 which claims priority to Chinese Patent Application No. 201010624685.9, filed on Dec. 31, 2010 and Chinese Patent Application No. 201110182150.5, filed on Jun. 30, 2011, all of which are hereby incorporated by reference in their entireties.

FIELD OF THE INVENTION

Embodiments of the present invention relate to the field of communication technologies, and in particular, to a method, an apparatus, and a system for selecting serving nodes for access.

BACKGROUND OF THE INVENTION

A heterogeneous network (Heterogeneous Network, HetNet) can effectively improve the current network system throughput, and is one of the hot topics of 3GPP standards currently discussed.

The existing HetNet may include one macro NodeB and multiple micro NodeBs. A user equipment (User Equipment, UE) selects a NodeB for access based on reference signal received power (Reference Signal Receiving Power, RSRP) of the NodeB; and after selecting the NodeB for access, the UE uses the NodeB as both the uplink serving node and downlink serving node of the UE. The process in which the UE selects a NodeB for access may be specified as follows: The UE measures the RSRP of reference signals sent by each NodeB (including a macro NodeB and a micro NodeB), then selects a NodeB of the best RSRP signal quality for access, and uses the NodeB as the uplink serving node and downlink serving node of the UE.

In the HetNet, the transmit power of the micro NodeB is far lower than the transmit power of the macro NodeB. For example, typically the transmit power of the macro NodeB is 46 dBm, while that of the micro NodeB is 24 dBm or 30 dBm, and the difference between them is 40-160 times. Because the RSRP of the macro NodeB detected by the UE is usually greater than that of the micro NodeB, in the process of selecting a NodeB for access, usually the existing UE tends to access the macro NodeB. Consequently, the coverage area of the macro NodeB is far greater than that of the micro NodeB, resulting in load imbalance between the macro NodeB and the micro NodeB and a low system capacity.

SUMMARY OF THE INVENTION

Embodiments of the present invention provide a method, an apparatus, and a system for selecting serving nodes for access, which can balance the load between the macro NodeB and the micro NodeB and improve system network capacity.

An embodiment of the present invention provides a method for selecting serving nodes for access, where the method includes:

obtaining reference signal received parameters of at least two nodes, where the reference signal received parameters include reference signal received power or reference signal received quality;

selecting a downlink serving node from the at least two nodes according to the reference signal received parameter of each of the nodes; and sending an uplink signal, so that the downlink serving node selects an uplink serving node from the at least two nodes according to the uplink signal; or, selecting an uplink serving node from the at least two nodes according to the reference signal received parameter of each of the nodes, and sending an uplink signal, so that a binding relationship is established between the uplink serving node and the downlink serving node.

An embodiment of the present invention also provides a method for selecting serving nodes for access, where the method includes:

receiving an uplink signal sent by a user equipment after the user equipment selects an uplink serving node; and establishing a binding relationship between a downlink serving node and the uplink serving node according to the uplink signal.

An embodiment of the present invention provides an apparatus for selecting serving nodes for access, where the apparatus includes:

an obtaining module, configured to obtain reference signal received parameters of at least two nodes, where the reference signal received parameters include reference signal received power or reference signal received quality;

a downlink selecting module, configured to select a downlink serving node from the at least two nodes according to the reference signal received parameter of each of the nodes obtained by the obtaining module; and a sending module, configured to send an uplink signal, so that the downlink serving node selects an uplink serving node from the at least two nodes according to the uplink signal; or, configured to select an uplink serving node from the at least two nodes according to the reference signal received parameter of each of the nodes, and send an uplink signal, so that a binding relationship is established between the uplink serving node and the downlink serving node.

An embodiment of the present invention also provides a node, including:

a first receiving module, configured to receive an uplink signal and select an uplink serving node from at least two nodes according to the uplink signal; and a first establishing module, configured to establish a binding relationship with the uplink serving node.

An embodiment of the present invention also provides a node, including:

a second receiving module, configured to receive an uplink signal sent by a user equipment after the user equipment selects an uplink serving node; and a second establishing module, configured to establish a binding relationship between a downlink serving node and the uplink serving node according to the uplink signal.

An embodiment of the present invention also provides a system for selecting serving nodes for access, which includes: an apparatus for selecting serving nodes for access and at least two nodes; the at least two nodes are configured to provide a downlink serving node and an uplink serving node for the apparatus for selecting serving nodes for access; the apparatus for selecting serving nodes for access is any apparatus for selecting serving nodes for access according to an embodiment of the present invention, and the node is any node provided by the embodiment of the present invention.

With the method, apparatus and system for selecting serving nodes for access according to embodiments of the present invention, the user equipment obtains reference signal received parameters of at least two nodes, and selects a downlink serving node from the at least two nodes according to the reference signal received parameter of each node; then the user equipment sends an uplink signal, so that an uplink serving node is selected from the at least two nodes. Therefore, by selecting an uplink serving node and a downlink serving node respectively, load balancing between different nodes can be implemented and system capacity can be improved.

BRIEF DESCRIPTION OF THE DRAWINGS

To illustrate the technical solutions of the embodiments of the present invention or that of the prior art more clearly, the accompanying drawings used in the description of the embodiments or the prior art are briefly described hereunder. Evidently, the accompanying drawings illustrate only some exemplary embodiments of the present invention, and persons of ordinary skill in the art can derive other drawings from these drawings without creative efforts.

DETAILED DESCRIPTION OF THE EMBODIMENTS

To make the objectives, technical solutions, and advantages of the present invention more comprehensible, the technical solutions provided by the embodiments of the present invention are hereinafter described clearly and completely with reference to the accompanying drawings. Evidently, the described embodiments are only some exemplary embodiments of the present invention, rather than all embodiments of the present invention. All other embodiments, which can be derived by persons of ordinary skill in the art from the embodiments given herein without any creative effort, shall fall within the scope of the present invention.

Figure 1:
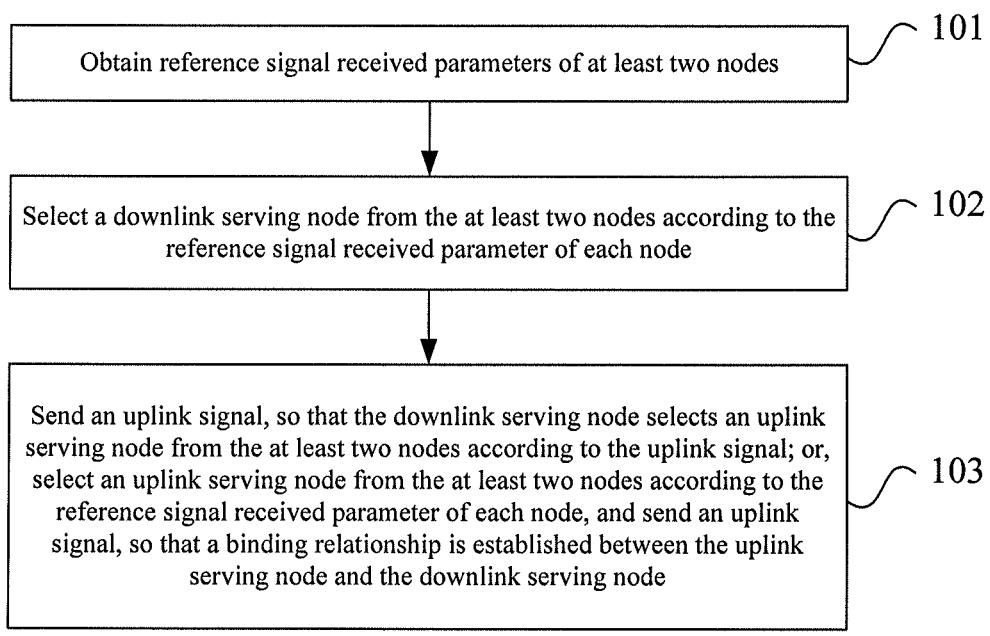
FIG. 1 is a flowchart of a first embodiment of a method for selecting serving nodes for access according to the present invention.

FIG. 1 is a flowchart of a first embodiment of a method for selecting serving nodes for access according to the present invention. As shown in FIG. 1, the method includes:

Step 101: Obtain reference signal received parameters of at least two nodes. The reference signal received parameters may include reference signal received power (RSRP) or reference signal received quality (RSRQ).

Embodiments of the present invention may be applied to a system where multiple nodes of different power types coexist, for example, a HetNet. The executor of this embodiment is a UE.

The UE measures the RSRP/RSRQ of the reference signals sent by each node, and obtains the RSRP/RSRQ of each node.

Step 102: Select a downlink serving node from the at least two nodes according to the reference signal received parameter of each node.

The UE selects one from the nodes as a downlink serving node according to the obtained RSRP/RSRQ of each node.

The selection mode may be: (1) selecting a node of the best RSRP/RSRQ signal quality, namely, a node of the largest RSRP/RSRQ, as the downlink serving node according to the RSRP/RSRQ of each node; or (2) obtaining the bias of each node from the system parameter of each node, then obtaining the sum of the RSRP/RSRQ of each node and the bias, and selecting a node of the largest sum of the RSRP/RSRQ and the bias as a downlink serving node.

Step 103: Send an uplink signal, so that the downlink serving node selects an uplink serving node from the at least two nodes according to the uplink signal; or, select an uplink serving node from the at least two nodes according to the reference signal received parameter of each node, and send an uplink signal, so that a binding relationship is established between the uplink serving node and the downlink serving node.

Figure 1A:
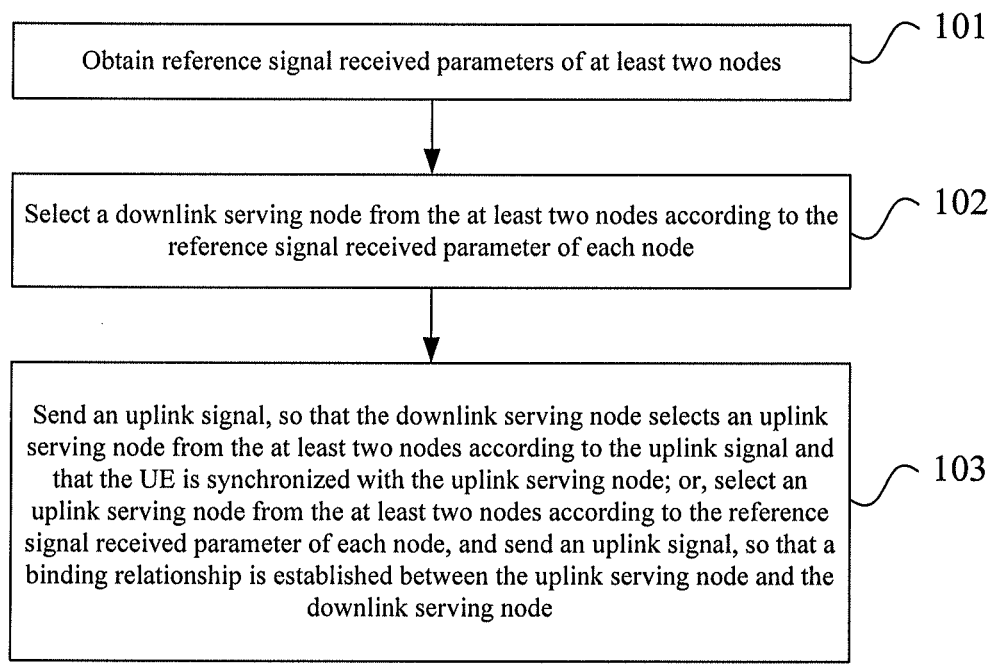
FIG. 1A is another flowchart of the first embodiment of the method for selecting serving nodes for access according to the present invention.

In an embodiment, the uplink signal is further used to enable the UE to be synchronized with the uplink serving node. That is, as shown in FIG. 1A, step 103 may also be:

Send an uplink signal, so that the downlink serving node selects an uplink serving node from the at least two nodes according to the uplink signal and that the UE is synchronized with the uplink serving node; or, select an uplink serving node from the at least two nodes according to the reference signal received parameter of each node, and send an uplink signal, so that a binding relationship is established between the uplink serving node and the downlink serving node.

The uplink signal in the embodiment of the present invention may be an uplink random access message, for example, a piece of layer 2/layer 3 (L2/L3) signaling including an identifier of the uplink serving node or an identifier of the downlink serving node; or the uplink signal may be an uplink random access signal, for example, a preamble (Preamble) signal; or the uplink signal may be a quality report message for reporting RSRP/RSRQ or path loss information of the node. It is understandable that, in an embodiment, the uplink signal may also be a combination of the above types, for example, first sending an uplink random access signal to access the downlink serving node, then sending an uplink random access message to implement uplink synchronization between the UE and the downlink serving node, then sending a quality report message for reporting RSRP/RSRQ or path loss information of each node according to a UE measurement indication from the downlink serving node, and afterward sending a non-contention random access signal according to the random access resource indicated by the downlink serving node and the specified preamble sequence, so as to implement UE uplink synchronization with the uplink serving node.

When the uplink signal includes the identifier of the downlink serving node or the identifier of the uplink serving node, the uplink signal may be an uplink random access message; when the uplink signal does not include the identifier of the downlink serving node and the identifier of the uplink serving node, the uplink signal may be an uplink random access signal; when the uplink signal includes RSRP/RSRQ or path loss information of the node, the uplink signal may be a quality report message.

After the UE selects a downlink serving node, the UE sends an uplink signal, so that the downlink serving node selects an uplink serving node for the UE by interacting with the UE or other nodes after receiving the uplink signal. Other nodes can detect the random access channel of each node, and when detecting a preamble signal of the UE in a random access channel, can determine the node corresponding to the random access channel as a downlink serving node.

After the UE selects a downlink serving node, the UE can also select an uplink serving node according to the RSRP/RSRQ of each node and the transmit power of each node, and after selecting the uplink serving node, sends an uplink signal, where the uplink signal may include the identifier of the uplink serving node when being sent to the downlink serving node, and the uplink signal may include the identifier of the downlink serving node when being sent to the uplink serving node; the uplink serving node may learn the downlink serving node according to the uplink signal, and the downlink serving node may learn the uplink serving node according to the uplink signal.

After the downlink serving node and uplink serving node are selected, if the downlink serving node is different from the uplink serving node, a binding relationship between the downlink serving node and the uplink serving node is established, and then the UE is enabled to access different uplink and downlink nodes.

In a system where multiple nodes of different power types coexist, uplink and downlink features are different in essence: for the downlink, transmit power of a high-power node is greatly different from that of a low-power node, while for the uplink, transmit power of the UE is the same; when the node selecting technology in the prior art is used, because the uplink and downlink use the same node, it is difficult to adapt to the great difference between the uplink and the downlink in the system and thus impossible to achieve optimal system performance.

In the embodiment of the present invention, the user equipment obtains the reference signal received parameter of each node, and selects a downlink serving node according to the reference signal received parameter of each node; then the user equipment sends an uplink signal, so that an uplink serving node is selected from the at least two nodes. Therefore, by selecting an uplink serving node and a downlink serving node respectively in this embodiment, load balancing between different nodes can be implemented and system capacity can be improved.

Figure 2A:
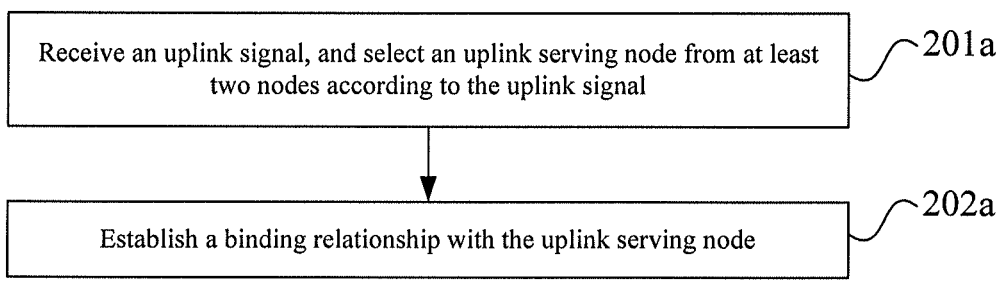
FIG. 2A is a flowchart of an embodiment 2A of a method for selecting serving nodes for access according to the present invention.

FIG. 2A is a flowchart of an embodiment 2A of a method for selecting serving nodes for access according to the present invention. As shown in FIG. 2A, the method includes:

Step 201a: Receive an uplink signal, and select an uplink serving node from at least two nodes according to the uplink signal.

This embodiment corresponds to the embodiment shown in FIG. 1. The executor of this embodiment is a node, and specifically, the executor of this embodiment may be a selected downlink serving node. A detailed description is provided hereunder.

When the uplink signal does not include the identifier of the uplink serving node: after receiving the uplink signal, the downlink serving node may send an indication message to the UE; after receiving the indication message, the UE sends the RSRP/RSRQ of the node corresponding to the indication message or the path loss information of the node to the downlink serving node according to the indication message; then the downlink serving node selects an uplink serving node for the UE according to the received RSRP/RSRQ or path loss information of the node. The node corresponding to the indication message is a node satisfying the requirement of the indication message, for example, the indication message may require the UE to report the measurement result of a node included in a whitelist, require the UE to report the measurement results of other measured nodes other than the blacklist, or require the UE to report the measurement results of a specified number of nodes with strongest signals. Other nodes can detect the random access channel of each latent downlink serving node, and when detecting a preamble signal of the UE in the random access channel of a node, can determine the node as a downlink serving node of the UE. Other nodes may not detect random access channels of all nodes, for example, usually, a micro NodeB in a macro cell only needs to detect the random access channel of the macro cell; that is, the latent downlink serving nodes that the micro NodeB needs to detect are: the UE corresponding to the micro NodeB may select the macro NodeBs as a downlink serving node.

Alternatively, when the uplink signal does not include the identifier of the uplink serving node: the downlink serving node may receive uplink signal received parameters sent by other nodes, where the uplink signal received parameters of other nodes are sent to the downlink serving node by other nodes upon receiving the uplink signal; then the downlink serving node may select an uplink serving node for the UE according to the uplink signal received parameter of each node. In this solution, for other nodes (nodes other than the downlink serving node), after receiving the uplink signal, other nodes may obtain the uplink signal received parameter of the uplink signal; then other nodes send the obtained uplink signal received parameter to the downlink serving node, so that the downlink serving node selects one from all nodes as the uplink serving node. The method for other nodes to judge which node is the uplink serving node may refer to the above description.

Step 202a: Establish a binding relationship with the uplink serving node.

In the previous step, the selected uplink serving node and downlink serving node may be not the same node. When the uplink serving node and downlink serving node are not the same node: the downlink serving node sends the mapping relationship between the UE and the downlink serving node to the uplink serving node, so as to establish a binding relationship between the downlink serving node and the uplink serving node.

After the binding relationship between the downlink serving node and the uplink serving node is established, the UE can communicate with different uplink and downlink serving nodes. In the communication process, the uplink serving node sends uplink resource allocation signaling, downlink transmission related hybrid automatic repeat request (Hybrid Automatic Repeat Request, HARQ) feedback signaling, channel quality indicator (Channel Quality Indicator, CQI) report signaling, and so on to the downlink serving node, so as to support the downlink serving node in sending uplink resource allocation signaling and transmitting downlink data to the UE.

In the embodiment of the present invention, the downlink serving node selects an uplink serving node from multiple nodes according to the uplink signal which is sent by the user equipment and includes the identifier of the downlink serving node. Therefore, by selecting an uplink serving node and a downlink serving node respectively in this embodiment, load balancing between different nodes can be implemented and system network capacity can be improved.

Figure 2B:
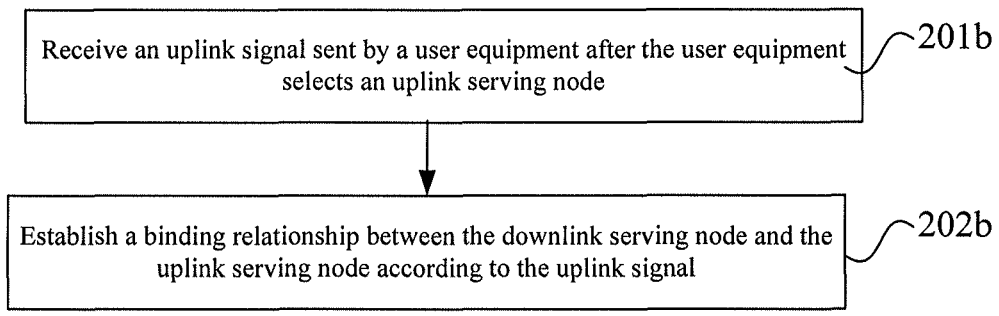
FIG. 2B is a flowchart of an embodiment 2B of a method for selecting serving nodes for access according to the present invention.
Figure 2C:
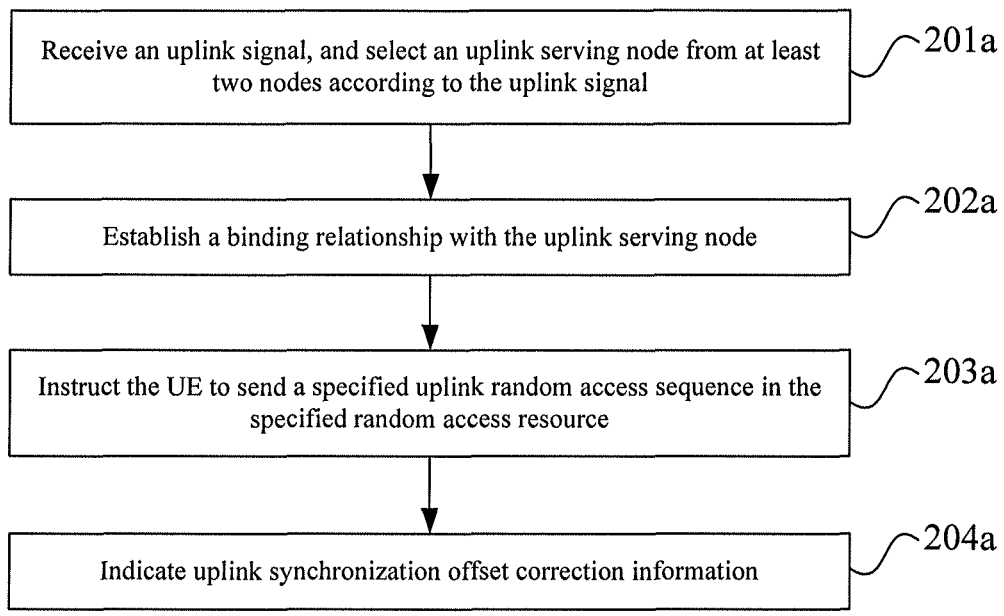
FIG. 2C is a flowchart of an embodiment 2C of a method for selecting serving nodes for access according to the present invention.

FIG. 2C is a flowchart of an embodiment 2C of a method for selecting serving nodes for access according to the present invention. As shown in FIG. 2C, in another embodiment, in addition to the above steps 201a and 202a, the method may further include:

Step 203a: Instruct the UE to send a specified uplink random access sequence in the specified random access resource.

Through the above step, the UE can already communicate with the uplink serving node, but has not established uplink synchronization with the uplink serving node yet, thus, it can transmit only a random access signal to the uplink serving node temporarily, but can't transmit data signals.

To measure the synchronization offset between the UE and the uplink serving node, the downlink serving node needs to instruct the UE to send a specified random access sequence in the specified random access resource.

Step 204a: The downlink serving node indicates uplink synchronization offset correction information, for example, a timing advance (Timing Advance) and frequency offset (Frequency Offset). That is, the downlink serving node sends the uplink synchronization offset correction information to the UE, so that the UE can correct the synchronization offset to implement uplink synchronization with the uplink serving node.

After measuring the above random access sequence sent by the UE, the uplink serving node obtains uplink synchronization offset information and transmits it to the bound downlink serving node.

After receiving the above uplink synchronization offset information, the downlink serving node notifies it to the UE through downlink signaling, so that the UE can correct the synchronization offset to implement uplink synchronization with the uplink serving node.

In the embodiment of the present invention, the downlink serving node selects an uplink serving node from multiple nodes according to the uplink signal that is sent by the user equipment and includes the RSRP/RSRP corresponding to the uplink node or the path loss information corresponding to the uplink node or the identifier of the uplink serving node. Therefore, by selecting an uplink serving node and a downlink serving node respectively in this embodiment, load balancing between different nodes can be implemented and system network capacity can be improved.

FIG. 2B is a flowchart of an embodiment 2B of a method for selecting serving nodes for access according to the present invention. As shown in FIG. 2B, the method includes:

Step 201b: Receive an uplink signal sent by a user equipment after the user equipment selects an uplink serving node.

This embodiment corresponds to the embodiment shown in FIG. 1. The executor of this embodiment is a node, and specifically, the executor of this embodiment may be a downlink serving node selected by the user equipment, or may be an uplink serving node selected by the user equipment.

In this embodiment, the user equipment already selects the downlink serving node and uplink serving node respectively; then the user equipment may send the uplink signal including the identifier of the uplink serving node to the downlink serving node, or, the user equipment sends the uplink signal including the identifier of the downlink serving node to the uplink serving node. The following describes the two cases respectively.

a. The executor of this embodiment is a downlink serving node.

The user equipment sends the uplink signal including the identifier of the uplink serving node to the downlink serving node, and the downlink serving node can learn the uplink serving node of the UE after receiving the uplink signal.

b. The executor of this embodiment is an uplink serving node.

The user equipment sends the uplink signal including the identifier of the downlink serving node to the uplink serving node, and the uplink serving node can learn the downlink serving node of the UE after receiving the uplink signal.

Step 202b: Establish a binding relationship between the downlink serving node and the uplink serving node according to the uplink signal.

In the previous step, the selected uplink serving node and downlink serving node may be not the same node. When the uplink serving node and downlink serving node are not the same node: if the downlink serving node learns the uplink serving node, the downlink serving node sends the mapping relationship between the UE and the downlink serving node to the uplink serving node, so as to establish a binding relationship between the downlink serving node and the uplink serving node; if the uplink serving node learns that the uplink serving node itself is the uplink serving node, the uplink serving node sends the mapping relationship between the UE and the uplink serving node to the downlink serving node, so as to establish a binding relationship between the downlink serving node and the uplink serving node.

After the binding relationship between the downlink serving node and the uplink serving node is established, the UE can communicate with different uplink and downlink serving nodes. In the communication process, the uplink serving node sends uplink resource allocation signaling, downlink transmission related HARQ feedback signaling, CQI report signaling, and so on to the downlink serving node, so as to support the downlink serving node in sending uplink resource allocation signaling and transmitting downlink data to the UE.

In the embodiment of the present invention, the node selects an uplink serving node from multiple nodes according to the uplink signal which is sent by the user equipment and includes the identifier of the downlink serving node. Therefore, by selecting an uplink serving node and a downlink serving node respectively in this embodiment, load balancing between different nodes can be implemented and system network capacity can be improved.

In the solution provided by the embodiment of the present invention, the downlink serving node may select the uplink serving node, or the UE may select the uplink serving node. The following describes the embodiments of the present invention in detail through a third embodiment to a fifth embodiment.

Figure 3:
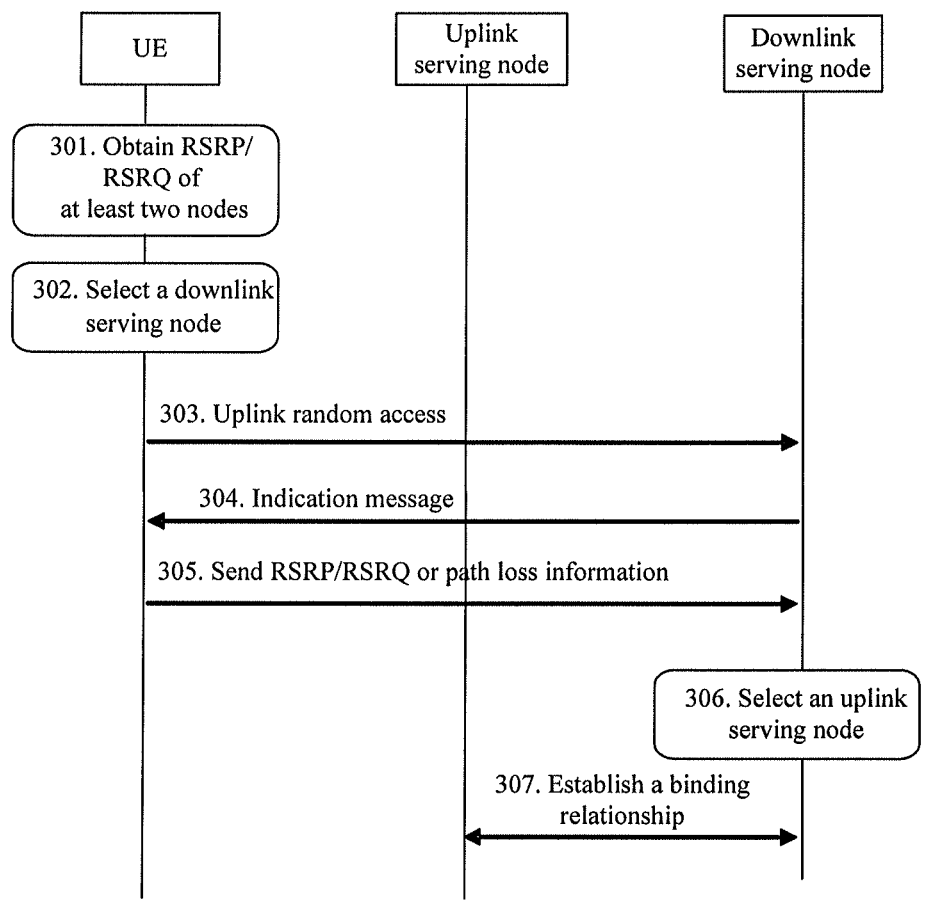
FIG. 3 is a signaling flowchart of a third embodiment of a method for selecting serving nodes for access according to the present invention.

FIG. 3 is a signaling flowchart of a third embodiment of a method for selecting serving nodes for access according to the present invention. In this embodiment, the downlink serving node selects an uplink serving node; as shown in FIG. 3, the method includes:

Step 301: The UE obtains RSRP/RSRQ of at least two nodes.

The UE may receive reference signals sent by multiple nodes, and then the UE measures the RSRP/RSRQ of the reference signal corresponding to each node to obtain the RSRP/RSRQ of each node. The multiple nodes may include high-power nodes and low-power nodes. High-power nodes are nodes of high transmit power, for example, a macro NodeB, and a high-power antenna. Low-power nodes are nodes of low transmit power, for example, a micro NodeB, a relay (Relay) node, and a low-power antenna.

Step 302: The UE selects a downlink serving node from the at least two nodes according to the RSRP/RSR of each node.

The modes for the UE to select the downlink serving node may include the following two modes:

First mode: The UE selects, from all nodes, a node of the largest RSRP/RSRQ in the RSRP/RSRQ of all nodes as a downlink serving node. The first mode is a special example of the second mode in which the first bias is 0.

Second mode: The UE obtains the first bias of each node from the system parameter of each node, and selects, from all nodes, a node of the largest sum of the RSRP/RSRQ and the first bias as a downlink serving node.

The nodes in embodiments of the present invention may be classified into two types: first node and second node; the first node is a high-power node, and the second node is a low-power node; the first biases corresponding to all first nodes are the same, and the first biases corresponding to all second nodes are the same. In the above second mode, the first bias corresponding to the high-power node is smaller than or equal to the first bias corresponding to the low-power node. For example, the first bias bias1 may be used for the low-power node, while no bias is used for the high-power node, that is, the first bias of the high-power node is 0. Specifically, in a heterogeneous network including a 46 dBm macro NodeB and a 30 dBm micro NodeB, bias1 of the low-power node may be, for example, a value between 0 dB and 10 dB.

Usually, when the uplink and downlink serving nodes are different, the downlink serving node selected by the UE is a high-power node, for example, a macro NodeB.

Step 303: The UE sends an uplink random access signal to access the selected downlink serving node.

After the UE selects the downlink serving node, the UE sends an uplink random access signal to access the downlink serving node.

In an embodiment, the random access process may include signaling interaction between the UE and the downlink serving node, for example, with respect to contention-based random access, to solve the contention conflict caused by simultaneous sending of random access signals by multiple UEs, after the UE sends an uplink random access signal, the downlink serving node needs to send a piece of random access feedback signaling to notify information such as the detection result of the random access signal and the uplink resource scheduling to the UE; then the UE sends a message in the scheduled uplink resource position according to the information to notify the UE identifier to the downlink serving node; finally, the downlink serving node sends a piece of feedback acknowledgement signaling including the UE identifier.

Step 304: After the downlink serving node receives the uplink random access signal sent by the UE, the downlink serving node sends an indication message to the UE, so that the UE sends an uplink signal including the RSRP/RSRQ or path loss information of the node corresponding to the indication message to the downlink serving node.

The uplink signal in this embodiment may be a quality report message.

After the downlink serving node receives the uplink random access signal (for example, a preamble signal) sent by the UE, the downlink serving node sends random access feedback to the UE to help the UE perform uplink synchronization and uplink power control, and the downlink serving node sends an indication message to the UE; or after the downlink serving node receives the uplink random access signal sent by the UE, the downlink serving node sends random access feedback to the UE to help the UE perform uplink synchronization and uplink power control; then the downlink serving node receives an uplink random access message (for example, a layer 2/layer 3 message) sent by the UE; then the downlink serving node sends an indication message to the UE.

The indication message may carry specific requirements.

Step 305: The UE sends the uplink signal including the RSRP/RSRQ or path loss information of the node corresponding to the indication message to the downlink serving node according to the indication message sent by the downlink serving node.

After the UE receives the indication message sent by the downlink serving node, the UE sends the measured RSRP/RSRQ or path loss information of the node corresponding to the indication message to the downlink serving node through the uplink signal; when the UE receives the indication message, if the UE has not obtained the RSRP/RSRQ or path loss information of the required node, the UE measures the RSRP/RSRQ or path loss information of the required node and reports it.

According to the RSRP and transmit power of a node, the UE may obtain the path loss (PL) information corresponding to the node. Specifically, PL=Reference signal transmit power−RSRP. The path loss information measured by the UE is downlink path loss information.

Step 306: The downlink serving node selects an uplink serving node according to the RSRP/RSRQ or path loss information.

Specifically, if the downlink serving node receives the RSRP/RSRQ of each node sent by the UE, the downlink serving node obtains the transmit power of each node according to the system parameter of each node, then obtains the path loss information of each node according to the RSRP/RSRQ and transmit power, and then selects an uplink serving node according to the path loss information. If the downlink serving node receives the path loss information of each node sent by the UE, the downlink serving node may select the uplink serving node directly according to the path loss information. In addition, as a mode equivalent to using path loss information to select an uplink serving node, the downlink serving node may also select an uplink serving node directly according to RSRP/RSRQ.

The modes for the downlink serving node to select an uplink serving node according to path loss information may include the following two modes:

First mode: The downlink serving node selects a node of smallest path loss in path loss information as an uplink serving node. The first mode is a special example of the second mode in which the second bias is 0.

Second mode: The downlink serving node obtains the second bias of each node from the system parameter of each node, and selects a node of the smallest difference between the path loss information and the second bias from the nodes as an uplink serving node.

In the above second mode, the second biases corresponding to all high-power nodes are the same, and the second biases corresponding to all low-power nodes are the same. The second bias corresponding to a high-power node is smaller than or equal to the second bias corresponding to a low-power node. For example, the second bias bias2 may be used for the low-power node, while no bias is used for the high-power node, that is, the second bias of the high-power node is 0. For example, in a heterogeneous network including a 46 dBm macro NodeB and a 30 dBm micro NodeB, bias2 of the low-power node may be, for example, a value between 15 dB and 30 dB.

It should be noted that in an equivalent solution of the second mode, an uplink serving node may be selected according to RSRP other than path loss information. The equivalent solution is the above solution in which the downlink serving node may select an uplink serving node directly according to RSRP/RSRQ. In this case, the fourth bias of each node is bias2', and the relationship between the bias2' and the above bias2 is: bias2'=PHPN−PLPN−bias2, where PHPN is transmit power of the high-power node, and PLPN is transmit power of the low-power node, that is, Fourth bias=Transmit power of the first node−Transmit power of the second node−Second bias. In the equivalent solution, when the uplink serving node is selected, the node of the largest sum of the reference signal received parameter and the fourth bias is selected as the uplink serving node. It should be noted that in the two-layer network, transmit power of all high-power nodes is the same, and that transmit power of all low-power nodes is the same. In this case, the fourth biases corresponding to all high-power nodes are the same, and the fourth biases corresponding to all low-power nodes are the same. In the network of more than 3 layers, in the relation between bias2' and bias2 above, transmit power of a low-power node is the transmit power of a current node, while the transmit power of a high-power node may be the highest transmit power selected from all nodes, or a fixed reference value (for example, 46 dBm).

Usually, the uplink serving node selected according to the path loss information is a low-power node nearest to the UE, for example, a micro NodeB nearest to the UE. Using the second mode to select the uplink serving node may ensure load balancing of the system better.

A special example of selecting the uplink and downlink serving nodes in this embodiment is: The UE selects a node of best RSRP/RSRQ signal quality (namely, with the largest RSRP/RSRQ value) in the downlink as the downlink serving node; while in the uplink, the downlink serving node selects a node of smallest path loss information as the uplink serving node. In this special example, the optimal system performance can be achieved even if the UE is not capable of detecting weak signals at all.

Step 307: A binding relationship is established between the downlink serving node and the uplink serving node.

The downlink serving node and uplink serving node selected in this embodiment usually are not the same node; in this case, the binding relationship between the downlink serving node and the uplink serving node needs to be established. Specifically:

After selecting the uplink serving node, the downlink serving node sends the mapping relationship between the downlink serving node and the UE to the uplink serving node; after receiving the mapping relationship between the downlink serving node and the UE, the uplink serving node allocates corresponding resources to the UE; therefore, coordinated and consistent uplink and downlink services can be provided for the UE through information transmission between the uplink and downlink serving nodes; the downlink transmission is performed between the downlink serving node and the UE, and the uplink transmission is performed between the UE and the uplink serving node. The information transmission between uplink and downlink serving nodes may be implemented in multiple modes, for example, by using a wired link supporting an X2 interface, a wireless backhaul link, radio over fiber (RoF), or distributed antennas.

In this embodiment, different criteria are used for the downlink and the uplink when nodes are selected or reselected. In this way, a high-power node may be used in the downlink, and a low-power node may be used in the uplink; in addition, nodes of different power types can collaborate with each other to provide services for the UE.

According to the embodiment of the present invention, in the heterogeneous network system including nodes of different power levels, in view of the different feature of uplink transmit power and downlink transmit power, the uplink and the downlink are optimized respectively to achieve better system performance than the prior art when the UE does not have capabilities of detecting weak signals or only has low capabilities of detecting weak signals.

Figure 3A:
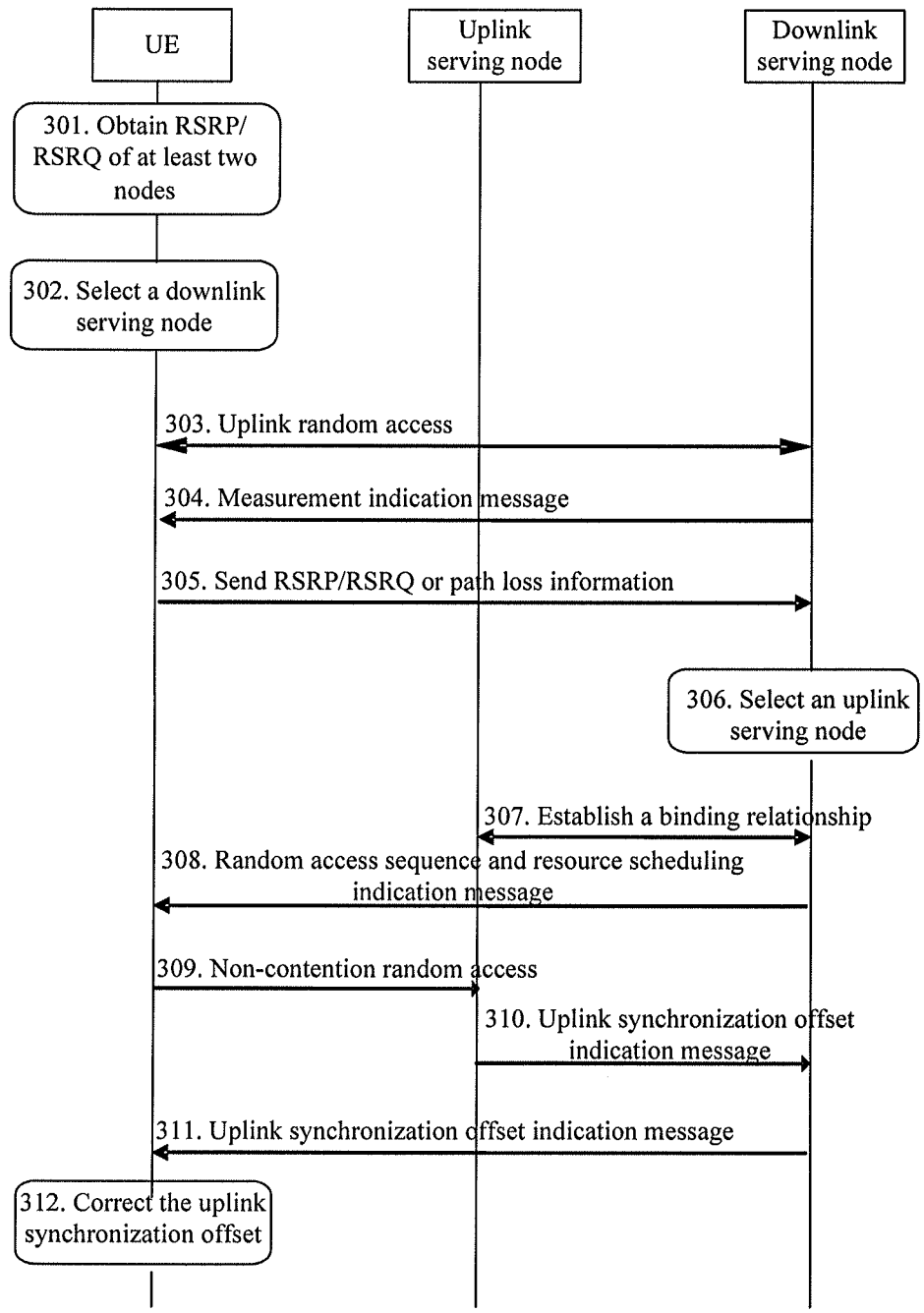
FIG. 3A is another signaling flowchart of the third embodiment of the method for selecting serving nodes for access according to the present invention.

FIG. 3A is another signaling flowchart of the third embodiment of the method for selecting serving nodes for access according to the present invention. As shown in FIG. 3A, in addition to the above steps 301-306, the method may further include:

Step 308: The downlink serving node sends a random access indication message to the UE, specifying the random access resource and the random access sequence, and instructing the UE to perform non-contention random access.

Step 309: The UE uses the specified random access sequence in the specified random access resource according to the random access indication message to send a non-contention random access signal.

Step 310: The uplink serving node detects the specified random access sequence in the specified random access resource, measures the uplink synchronization offset, and sends an uplink synchronization offset indication message to the downlink serving node.

Step 311: The downlink serving node sends an uplink synchronization offset indication message to the UE.

Step 312: The UE corrects the uplink synchronization offset according to the uplink synchronization offset indication message received from the downlink serving node and implements uplink synchronization with the uplink serving node.

According to the embodiment of the present invention, in the heterogeneous network system including nodes of different power levels, in view of the different feature of uplink transmit power and downlink transmit power, the uplink and the downlink are optimized respectively to achieve better system performance than the prior art when the UE does not have capabilities of detecting weak signals or only has low capabilities of detecting weak signals.

Figure 4:
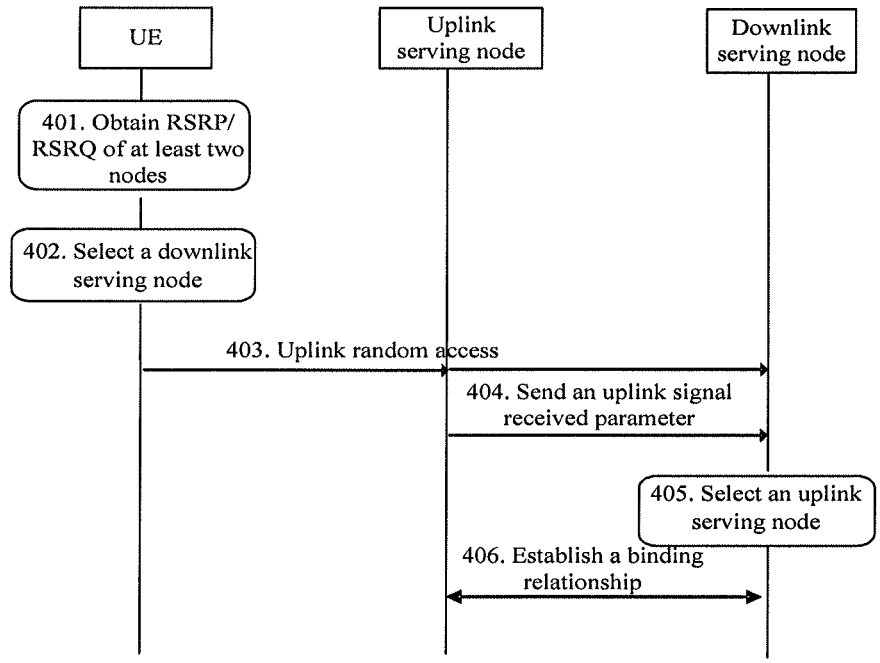
FIG. 4 is a signaling flowchart of a fourth embodiment of a method for selecting serving nodes for access according to the present invention.

FIG. 4 is a signaling flowchart of a fourth embodiment of a method for selecting serving nodes for access according to the present invention. In this embodiment, the downlink serving node selects an uplink serving node; as shown in FIG. 4, the method includes:

Step 401: The UE obtains RSRP/RSRQ of at least two nodes.

Step 402: The UE selects a downlink serving node from the at least two nodes according to the RSRP/RSR of each node.

Step 403: The UE sends an uplink random access signal to access the selected downlink serving node.

The uplink signal in this embodiment may be an uplink random access signal.

Step 401 to step 403 above may refer to the description in step 301 to step 303 in the embodiment shown in FIG. 3, and no repeated description is provided herein.

Step 404: Each node except the downlink serving node obtains the corresponding uplink signal received parameter according to the uplink random access signal, and sends the uplink signal received parameter to the downlink serving node.

The uplink signal received parameter may be a function of a correlation value between the received uplink random access signal received by the node and the corresponding preamble sequence locally stored by the node.

Each node obtains the uplink signal received parameter corresponding to each node respectively according to the uplink random access signal. Each node except the downlink serving node sends its uplink signal received parameter to the downlink serving node. The method for each node except the downlink serving node to identify the downlink serving node may refer to the description in step 201 in the embodiment shown in FIG. 2, and no repeated description is provided herein.

It should be noted that the uplink path loss between each node and the UE is equal to the difference between the transmit power of the UE and the received signal strength of the node. Because all nodes in this embodiment correspond to the same UE, the strength of the received signal is inversely proportional to that of the path loss. Therefore, in the specific implementation process, the uplink signal received parameter may be indirectly used to indicate uplink path loss; the greater the uplink signal received parameter of a node is, the smaller the corresponding uplink path loss is.

Step 405: The downlink serving node receives the uplink signal received parameters sent by other nodes, and then selects the uplink serving node from the at least two nodes according to each uplink signal received parameter.

The specific process for the downlink serving node to select the uplink serving node according to the uplink signal received parameter may include the following two modes:

First mode: The downlink serving node selects a node corresponding to the largest uplink signal received parameter among uplink signal received parameters as an uplink serving node. The first mode is a special example of the second mode in which the third bias is 0.

Second mode: The downlink serving node obtains the third bias of each node from the system parameter of each node, and selects a node of the largest sum of the uplink signal received parameter and the third bias from the nodes as an uplink serving node.

In the above second mode, the third biases corresponding to all high-power nodes are the same, and the third biases corresponding to all low-power nodes are the same; the third bias corresponding to a high-power node is smaller than or equal to the third bias corresponding to a low-power node.

Step 406: A binding relationship is established between the downlink serving node and the uplink serving node.

The specific process of this step may refer to the description in step 307 in the embodiment shown in FIG. 3.

The embodiment of the present invention has the same advantages as the embodiment shown in FIG. 3.

Figure 5:
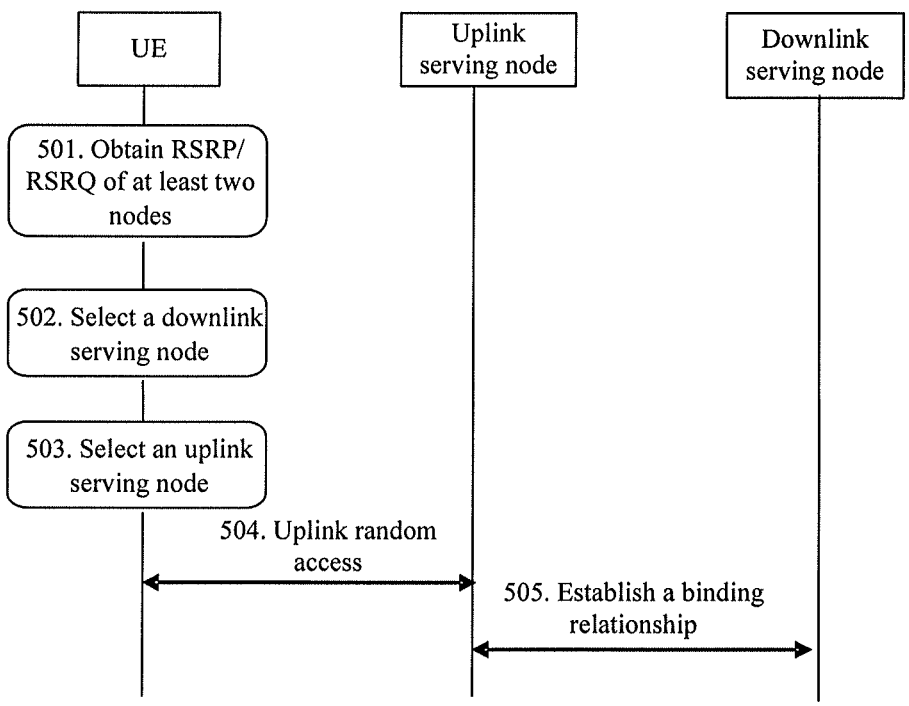
FIG. 5 is a signaling flowchart of a fifth embodiment of a method for selecting serving nodes for access according to the present invention.

FIG. 5 is a signaling flowchart of a fifth embodiment of a method for selecting serving nodes for access according to the present invention. In this embodiment, the UE selects an uplink serving node; as shown in FIG. 5, the method includes:

Step 501: The UE obtains RSRP/RSRQ of at least two nodes.

Step 502: The UE selects a downlink serving node from the at least two nodes according to the RSRP/RSR of each node.

The above step 501 to step 502 may refer to the description in step 301 to step 303 in the embodiment shown in FIG. 3, and no repeated description is provided herein.

Step 503: The UE obtains the path loss information corresponding to each node according to the RSRP/RSRQ of each node and the transmit power of each node, and selects an uplink serving node from the at least two nodes according to each piece of path loss information.

The specific process of selecting an uplink serving node according to the path loss information may refer to the description in step 306 of the embodiment shown in FIG. 3. This step differs from step 306 in the executor.

Step 504: The UE sends an uplink signal including the identifier of the uplink serving node to the downlink serving node, or sends an uplink signal including the identifier of the downlink serving node to the uplink serving node.

The uplink signal in this embodiment may be an uplink random access message.

The UE sends the uplink signal including the identifier of the uplink serving node to the downlink serving node, and in this case, the downlink serving node learns the mapping relationship among the UE, the uplink serving node and the downlink serving node. The UE sends the uplink signal including the identifier of the downlink serving node to the uplink serving node, an in this case, the uplink serving node learns the mapping relationship among the UE, the uplink serving node and the downlink serving node.

Step 505: The downlink serving node or uplink serving node receives the uplink signal sent by the user equipment in step 504, and then establishes a binding relationship between the downlink serving node and the uplink serving node.

In this step, the downlink serving node may receive the uplink signal, or the uplink serving node receives the uplink signal. That is, in this step, if the UE sends the uplink signal including the identifier of the downlink serving node to the uplink serving node, the UE accesses the uplink serving node (usually a low-power node); if the UE sends the uplink signal including the identifier of the uplink serving node to the downlink serving node, the UE accesses the downlink serving node (usually a high-power node). FIG. 5 only schematically shows the case that the UE accesses the uplink serving node.

When the UE accesses an uplink serving node, the uplink serving node sends the mapping relationship between the uplink serving node and the UE to the downlink serving node to establish a binding relationship between the uplink and downlink serving nodes. That is, the UE first accesses a low-power node, reports the downlink serving node information to the low-power node, and switches the downlink to a high-power downlink serving node.

When the UE accesses a downlink serving node, the downlink serving node sends the mapping relationship between the downlink serving node and the UE to the uplink serving node to establish a binding relationship between the uplink and downlink serving nodes. That is, the UE first accesses a high-power node, reports the uplink serving node information to the high-power node, and switches the uplink to a low-power uplink serving node.

In the embodiments of the present invention shown in FIG. 3 to FIG. 5, the user equipment obtains the reference signal received parameter of each node, and selects a downlink serving node according to the reference signal received parameter of each node; then the user equipment sends an uplink signal, so that the user equipment or the downlink serving node selects an uplink serving node from the at least two nodes. Therefore, by selecting an uplink serving node and a downlink serving node respectively in this embodiment, load balancing between different nodes can be implemented and system network capacity can be improved.

Persons of ordinary skill in the art may understand that all or part of the steps of the method according to the embodiments may be implemented by a program instructing relevant hardware.

The program may be stored in a computer readable storage medium. When the program runs, the steps of the method according to the embodiments are performed. The storage medium may be any medium capable of storing program codes, such as a ROM, a RAM, a magnetic disk, or a CD-ROM.

Figure 6:
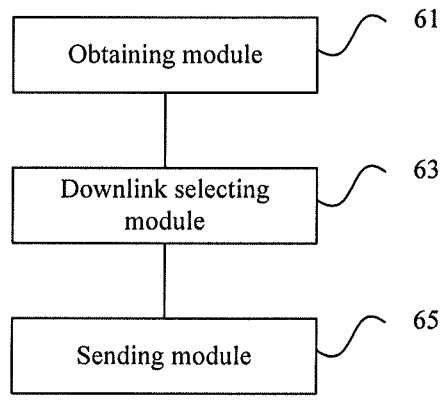
FIG. 6 is a schematic diagram of a first embodiment of an apparatus for selecting serving nodes for access according to the present invention.

FIG. 6 is a schematic diagram of a first embodiment of an apparatus for selecting serving nodes for access according to the present invention. As shown in FIG. 3, the apparatus includes: an obtaining module 61, a downlink selecting module 63, and a sending module 65.

The obtaining module 61 is configured to obtain reference signal received parameters of at least two nodes, where the reference signal received parameters include reference signal received power or reference signal received quality.

The downlink selecting module 63 is configured to select a downlink serving node from the at least two nodes according to the reference signal received parameter of each node obtained by the obtaining module 61.

The sending module 65 is configured to send an uplink signal, so that the downlink serving node selects an uplink serving node from the at least two nodes according to the uplink signal; or, configured to select an uplink serving node from the at least two nodes according to the reference signal received parameter of each node, and send an uplink signal, so that a binding relationship is established between the uplink serving node and the downlink serving node.

In an embodiment, the sending module 65 may be further configured to send an uplink signal, so that the downlink serving node selects an uplink serving node from the at least two nodes according to the uplink signal and that the UE is synchronized with the uplink serving node; or, configured to select an uplink serving node from the at least two nodes according to the reference signal received parameter of each of the nodes, and send an uplink signal, so that a binding relationship is established between the uplink serving node and the downlink serving node.

The apparatus for selecting serving nodes for access according to the embodiment of the present invention may be located in a UE, where the UE may be applied to a system in which multiple nodes of different power types coexist, for example, a HetNet.

The workflow and working principle of each module in this embodiment may refer to the description in the above first method embodiment, and no repeated description is provided herein.

In the embodiment of the present invention, the obtaining module in the UE obtains the reference signal received parameter of each node, and the downlink selecting module selects a downlink serving node according to the reference signal received parameter of each node; then the sending module sends an uplink signal, so that an uplink serving node is selected from the at least two nodes. Therefore, by selecting an uplink serving node and a downlink serving node respectively in this embodiment, load balancing between different nodes can be implemented and system capacity can be improved.

Figure 7:
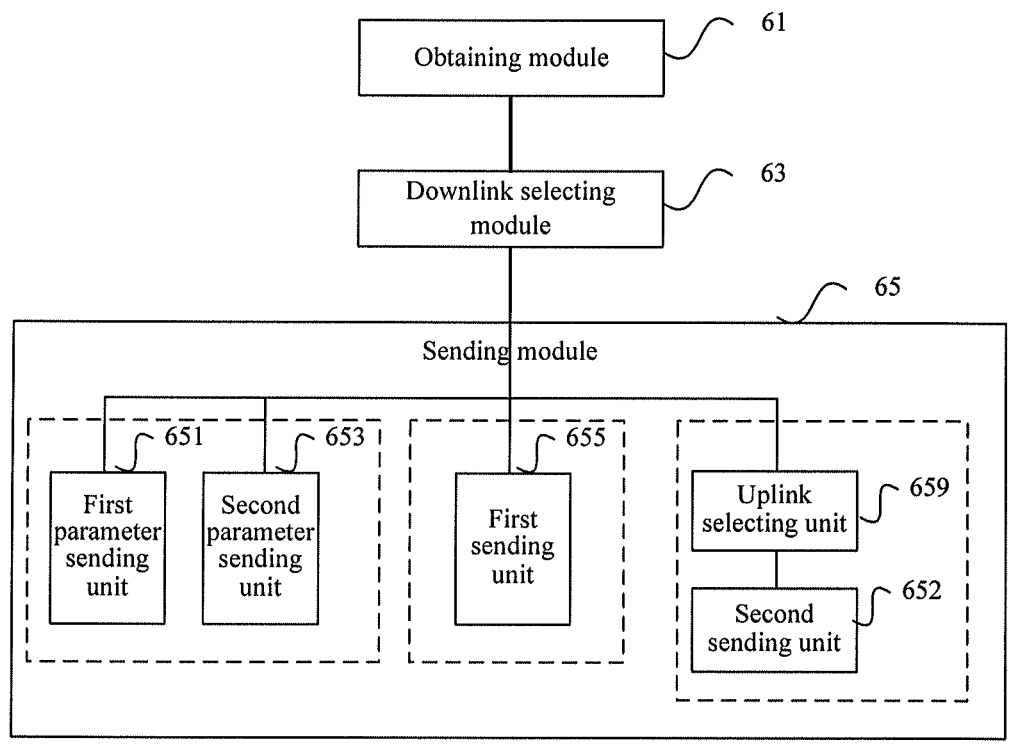
FIG. 7 is a schematic diagram of a second embodiment of an apparatus for selecting serving nodes for access according to the present invention.

FIG. 7 is a schematic diagram of a second embodiment of an apparatus for selecting serving nodes for access according to the present invention. On the basis of the embodiment shown in FIG. 6, as FIG. 7 shows, the sending module 65 comprises: a first parameter sending unit 651 and/or a second parameter sending unit 653; or, the sending module 65 comprises a first sending unit 655; or, the sending module 65 comprises an uplink selecting unit 659 and a second sending unit 652.

The first parameter sending unit 651 is configured to: according to an indication message sent by the downlink serving node, send an uplink signal including the reference signal received parameter of the node corresponding to the indication message to the downlink serving node, so that the downlink serving node selects an uplink serving node from at least two nodes according to the reference signal received parameter of each node in the received uplink signal.

The second parameter sending unit 653 is configured to: according to an indication message sent by the downlink serving node, send an uplink signal including the path loss information of the node corresponding to the indication message to the downlink serving node, so that the downlink serving node selects an uplink serving node from at least two nodes according to the path loss information of each node in the received uplink signal.

In an embodiment, the first parameter sending unit 651 may be further configured to: according to an indication message sent by the downlink serving node, send an uplink signal including the reference signal received parameter of the node corresponding to the indication message to the downlink serving node, so that the downlink serving node selects an uplink serving node from the at least two nodes according to the reference signal received parameter of each node in the received uplink signal and instructs the UE to send a specified uplink random access sequence in the specified random access resource and that the uplink serving node detects the uplink synchronization offset of the UE, whereupon the UE corrects the uplink synchronization offset according to the signaling sent by the downlink serving NodeB to implement synchronization between the UE and the uplink serving node; and/or the second parameter sending unit 653 may be further configured to: according to an indication message sent by the downlink serving node, send an uplink signal including the path loss information of the node corresponding to the indication message to the downlink serving node, so that the downlink serving node selects an uplink serving node from the at least two nodes according to the path loss information corresponding to each node in the received uplink signal and instructs the UE to send a specified uplink random access sequence in the specified random access resource and that the uplink serving node detects the uplink synchronization offset of the UE, whereupon the UE corrects the uplink synchronization offset according to the signaling sent by the downlink serving NodeB to implement synchronization between the UE and the uplink serving node.

The first sending unit 655 is configured to send an uplink signal for accessing a downlink serving node, so that each node except the downlink serving node sends the uplink signal received parameter corresponding to each node to the downlink serving node respectively according to the uplink signal and that the downlink serving node selects an uplink serving node from at least two nodes according to the uplink signal received parameter corresponding to each node.

The uplink selecting unit 659 is configured to select an uplink serving node from at least two nodes according to the reference signal received parameter of each node.

Further, the uplink selecting unit 659 specifically comprises a first subunit and/or a second subunit.

The first subunit is configured to obtain path loss information corresponding to each node according to the reference signal received parameter of each node and transmit power of each node, obtain a second bias of each node from the system parameter of each node, and select a node of the smallest difference between the path loss information and the second bias as an uplink serving node. The nodes include two types of nodes: first node and second node. The second biases corresponding to all first nodes are the same, the second biases corresponding to all second nodes are the same, and the second bias corresponding to the first node is smaller than or equal to the second bias corresponding to the second node. The second subunit is configured to select a node of the largest sum of the reference signal received parameter and the fourth bias from all nodes as an uplink serving node according to the reference signal received parameter of each node and the fourth bias of each node; the nodes include two types of nodes: first node and second node. The fourth biases corresponding to all first nodes are the same, and the fourth bias corresponding to the first node is smaller than or equal to the fourth bias corresponding to the second node.

The second sending unit 652 is configured to send the uplink signal including the identifier of the uplink serving node selected by the uplink selecting unit 659 to the downlink serving node, so that a binding relationship is established between the uplink serving node and the downlink serving node; or, send the uplink signal including the identifier of the downlink serving node to the uplink serving node, so that a binding relationship is established between the uplink serving node and the downlink serving node.

The downlink selecting module 63 is specifically configured to obtain the first bias of each node from the system parameter of each node, and select a node of the largest sum of the reference signal received parameter and the first bias from at least two nodes as a downlink serving node. The nodes include two types of nodes: first node and second node. The first biases corresponding to all first nodes are the same, and the first biases corresponding to all second nodes are the same. The first bias corresponding to the first node is smaller than or equal to the first bias corresponding to the second node; the first bias is not equal to the second bias; and the first bias is not equal to the fourth bias.

The workflow and working principle of each module and unit in this embodiment may refer to the description in the above method embodiments, and no repeated description is provided herein.

In the embodiment of the present invention, the UE obtains the reference signal received parameter of each node, and selects a downlink serving node according to the reference signal received parameter of each node; then the UE sends an uplink signal, so that an uplink serving node is selected from the at least two nodes. Therefore, by selecting an uplink serving node and a downlink serving node respectively in this embodiment, load balancing between different nodes can be implemented and system capacity can be improved.

Figure 8:
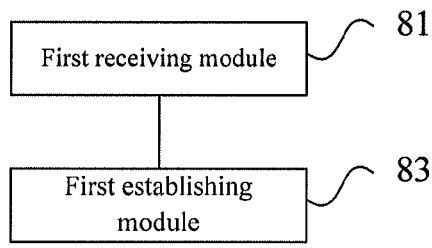
FIG. 8 is a schematic diagram of a first embodiment of a node according to the present invention.

FIG. 8 is a schematic diagram of a first embodiment of a node according to the present invention. As shown in FIG. 8, the node includes a first receiving module 81 and a first establishing module 83.

The first receiving module 81 is configured to receive an uplink signal and select an uplink serving node from at least two nodes according to the uplink signal.

The first establishing module 83 is configured to establish a binding relationship with the uplink serving node.

Specifically, in an embodiment, the first establishing module 83 may be specifically configured to send the mapping relationship with the user equipment to the above uplink serving node to establishing a binding relationship with the uplink serving node. The node provided by this embodiment may be a selected downlink serving node, and herein what the first establishing module 83 sends to the uplink serving node is a mapping relationship between the downlink serving node and the user equipment.

The node provided by this embodiment may be a selected downlink serving node. The workflow and working principle of each module in this embodiment may refer to the description in the above method embodiment 2A, and no repeated description is provided herein.

In the embodiment of the present invention, the node selects an uplink serving node from multiple nodes according to the uplink signal which is sent by the user equipment and includes the identifier of the downlink serving node. Therefore, by selecting an uplink serving node and a downlink serving node respectively in this embodiment, load balancing between different nodes can be implemented and system network capacity can be improved.

Figure 9:
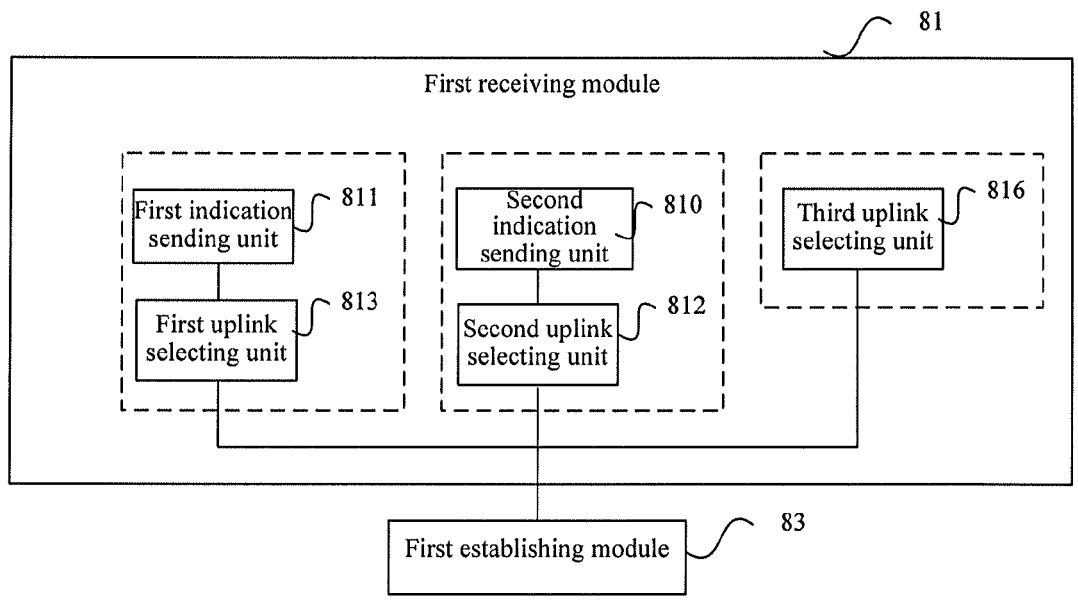
FIG. 9 is a schematic diagram of a second embodiment of a node according to the present invention.

FIG. 9 is a schematic diagram of a second embodiment of a node according to the present invention. On the basis of the embodiment shown in FIG. 8, as FIG. 9 shows, the first receiving module 81 may comprise a first indication sending unit 811 and a first uplink selecting unit 813;

or, the first receiving module 81 may comprise a second indication sending unit 810 and a second uplink selecting unit 812;

or, the first receiving module 81 may comprise a third uplink selecting unit 816.

The first indication sending unit 811 is configured to send an indication message to a user equipment, and receive an uplink signal which is sent by the user equipment and includes the reference signal received parameter of the node corresponding to the indication message. The first uplink selecting unit 813 is configured to select an uplink serving node from at least two nodes according to each reference signal received parameter in the received uplink signal.

The second indication sending unit 810 is configured to send an indication message to a user equipment, and receive an uplink signal which is sent by the user equipment and includes the path loss information of the node corresponding to the indication message.

The second uplink selecting unit 812 is configured to select an uplink serving node from at least nodes according to the path loss information of each node in the uplink signal.

The third uplink selecting unit 816 is configured to receive uplink signal received parameters sent by other nodes, where the uplink received signal carries the corresponding uplink signal received parameters obtained by each of other nodes according to the uplink signal sent by the user equipment, and select an uplink serving node from at least two nodes according to the uplink signal received parameter corresponding to each node.

The second uplink selecting unit 812 may be specifically configured to: obtain a second bias of each node from the system parameter of each node, and select a node of the smallest difference between the path loss information and the second bias from the nodes as the uplink serving node. The nodes include two types of nodes: first node and second node. The second biases corresponding to all first nodes are the same; the second biases corresponding to all second nodes are the same; and the second bias corresponding to the first node is smaller than or equal to the second bias corresponding to the second node.

The third uplink selecting unit 816 may be specifically configured to: obtain a third bias of each node from the system parameter of each node, and select a node of the largest sum of the uplink signal received parameter and the third bias from the nodes as the uplink serving node. The nodes include two types of nodes: first node and second node. The third biases corresponding to all first nodes are the same; the third biases corresponding to all second nodes are the same; and the third bias corresponding to the first node is smaller than or equal to the third bias corresponding to the second node.

The workflow and working principle of each module and unit in this embodiment may refer to the description in the above method embodiments, and no repeated description is provided herein.

In the embodiment of the present invention, the node selects an uplink serving node from multiple nodes according to the uplink signal which is sent by the user equipment and includes the identifier of the downlink serving node. Therefore, by selecting an uplink serving node and a downlink serving node respectively in this embodiment, load balancing between different nodes can be implemented and system network capacity can be improved.

Figure 10:
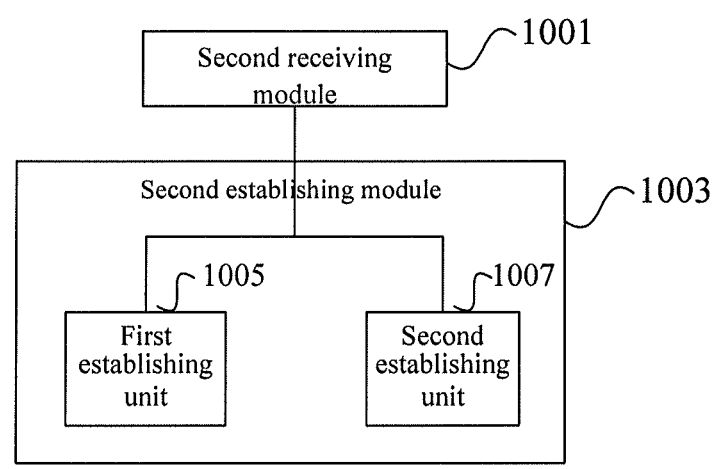
FIG. 10 is a schematic diagram of a third embodiment of a node according to the present invention.

FIG. 10 is a schematic diagram of a third embodiment of a node according to the present invention. As shown in FIG. 10, the node includes a second receiving module 1001 and a second establishing module 1003.

The second receiving module 1001 is configured to receive an uplink signal sent by a user equipment after the user equipment has selected an uplink serving node.

The second establishing module 1003 is configured to establish a binding relationship between a downlink serving node and the uplink serving node according to the uplink signal.

Further, on the basis of the above embodiment, the second receiving module 1001 may be specifically configured to: after the user equipment has selected an uplink serving node, when the node is a downlink serving node, receive an uplink signal which is sent by the user equipment and includes an identifier of the uplink serving node, or when the node is an uplink serving node, receive an uplink signal which is sent by the user equipment and includes an identifier of the downlink serving node.

The second establishing module 1003 may specifically comprise: a first establishing unit 1005 and a second establishing unit 1007.

The first establishing unit 1005 is configured to: when the node is an uplink serving node, send a mapping relationship between the uplink serving node and the user equipment to the downlink serving node to establish a binding relationship between the downlink serving node and the uplink serving node.

The second establishing unit 1007 is configured to: when the node is a downlink serving node, send a mapping relationship between the downlink serving node and the user equipment to the uplink serving node to establish a binding relationship between the downlink serving node and the uplink serving node.

The workflow and working principle of each module and unit in this embodiment may refer to the description in the above method embodiments, and no repeated description is provided herein.

In the embodiment of the present invention, the node selects an uplink serving node from multiple nodes according to the uplink signal which is sent by the user equipment and includes the identifier of the downlink serving node. Therefore, by selecting an uplink serving node and a downlink serving node respectively in this embodiment, load balancing between different nodes can be implemented and system network capacity can be improved.

An embodiment of the present invention further includes a system for selecting serving nodes for access, including: a user equipment and at least two nodes. The above at least two nodes are configured to provide a downlink serving node and an uplink serving node for the apparatus for selecting serving nodes for access. The user equipment includes any apparatus for selecting serving nodes for access according to embodiments of the present invention, and the node is any node provided by embodiments of the present invention.

The workflow and working principle of each module and unit in this embodiment may refer to the description in the above method embodiments, and no repeated description is provided herein.

In the embodiment of the present invention, the node selects an uplink serving node from multiple nodes according to the uplink signal which is sent by the user equipment and includes the identifier of the downlink serving node. Therefore, by selecting an uplink serving node and a downlink serving node respectively in this embodiment, load balancing between different nodes can be implemented and system network capacity can be improved.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, such modifications or replacements do not cause the essence of corresponding technical solutions to depart from the spirit and scope of the present invention.

What is claimed is:

1. A method for selecting serving nodes for access, comprising:
   obtaining reference signal receiving parameters of at least two nodes, wherein the reference signal receiving parameters comprise reference signal receiving power or reference signal receiving quality;
   selecting a downlink serving node from the at least two nodes according to the reference signal receiving parameter of each of the nodes; and
   sending an uplink signal, so that the downlink serving node selects an uplink serving node from the at least two nodes according to the uplink signal; or, selecting an uplink serving node from the at least two nodes according to the reference signal receiving parameter of each of the nodes, and sending an uplink signal, so that a binding relationship is established between the uplink serving node and the downlink serving node;
   wherein the uplink signal is used to enable user equipment to be synchronized with the uplink serving node; and
   wherein the enabling the user equipment to be synchronized with the uplink serving node comprises:
   instructing the user equipment to send a specified uplink random access sequence in a specified random access resource, so that the uplink serving node detects an uplink synchronization offset of the user equipment, whereupon the user equipment corrects the uplink synchronization offset according to signaling sent by the downlink serving node to implement synchronization between the user equipment and the uplink serving node.

2. The method for selecting serving nodes for access according to claim 1, wherein sending an uplink signal, so that the downlink serving node selects an uplink serving node from the at least two nodes according to the uplink signal, comprises one of:

according to an indication message sent by the downlink serving node, sending an uplink signal comprising a reference signal receiving parameter of a node corresponding to the indication message to the downlink serving node, so that the downlink serving node selects an uplink serving node from the at least two nodes according to the reference signal receiving parameter of each node in the received uplink signal; or according to an indication message sent by the downlink serving node, sending an uplink signal comprising path loss information of a node corresponding to the indication message to the downlink serving node, so that the downlink serving node selects an uplink serving node from the at least two nodes according to the path loss information of each node in the received uplink signal.

3. The method for selecting serving nodes for access according to claim 1, wherein sending an uplink signal, so that the downlink serving node selects an uplink serving node from the at least two nodes according to the uplink signal, comprises:

sending an uplink signal for accessing the downlink serving node, so that each of the nodes except the downlink serving node sends an uplink signal receiving parameter corresponding to each of the nodes to the downlink serving node respectively according to the uplink signal and that the downlink serving node selects an uplink serving node from the at least two nodes according to the uplink signal receiving parameter corresponding to each of the nodes.

4. The method for selecting serving nodes for access according to claim 1, wherein selecting an uplink serving node from the at least two nodes according to the reference signal receiving parameter of each of the nodes, and sending an uplink signal, so that a binding relationship is established between the uplink serving node and the downlink serving node, comprise:

selecting an uplink serving node from the at least two nodes according to the reference signal receiving parameter of each of the nodes, and sending an uplink signal comprising an identifier of the uplink serving node to the downlink serving node, so that a binding relationship is established between the uplink serving node and the downlink serving node; or, selecting an uplink serving node from the at least two nodes according to the reference signal receiving parameter of each of the nodes, and sending an uplink signal comprising an identifier of the downlink serving node to the uplink serving node, so that a binding relationship is established between the uplink serving node and the downlink serving node.

5. The method for selecting serving nodes for access according to claim 2, wherein selecting an uplink serving node from the at least two nodes according to the reference signal receiving parameter of each of the nodes comprises:

according to the reference signal receiving parameter of each node and transmit power of each node, obtaining path loss information corresponding to each of the nodes, and selecting a node of a smallest difference between the path loss information and a bias, which is a system parameter of the node, from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node; or according to the reference signal receiving parameter of each node and a bias of each of the nodes, selecting a node of a largest sum of the reference signal receiving parameter and the bias from all nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

6. The method for selecting serving nodes for access according to claim 2, wherein selecting a downlink serving node from the at least two nodes according to the reference signal receiving parameter of each of the nodes comprises:

selecting a node of a largest sum of the reference signal receiving parameter and a bias, which is a system parameter of the node, from the at least two nodes as the downlink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

7. A method for selecting serving nodes for access, comprising:

receiving an uplink signal, and selecting an uplink serving node from at least two nodes according to the uplink signal; and establishing a binding relationship with the uplink serving node;

wherein the uplink signal is used to enable user equipment to be synchronized with the uplink serving node; and wherein the enabling the user equipment to be synchronized with the uplink serving node comprises:

instructing the user equipment to send a specified uplink random access sequence in a specified random access resource, so that the uplink serving node detects an uplink synchronization offset of the user equipment, whereupon the user equipment corrects the uplink synchronization offset according to signaling sent by a downlink serving node to implement synchronization between the user equipment and the uplink serving node.

8. The method for selecting serving nodes for access according to claim 7, wherein receiving an uplink signal, and selecting an uplink serving node from at least two nodes according to the uplink signal comprise:

sending an indication message to user equipment;

receiving an uplink signal that is sent by the user equipment and comprises a reference signal receiving parameter of a node corresponding to the indication message; and selecting an uplink serving node from the at least two nodes according to each of the reference signal receiving parameters in the received uplink signal.

9. The method for selecting serving nodes for access according to claim 7, wherein receiving an uplink signal, and selecting an uplink serving node from at least two nodes according to the uplink signal comprise:

sending an indication message to user equipment;

receiving an uplink signal which is sent by the user equipment and comprises path loss information of a node corresponding to the indication message; and selecting an uplink serving node from the at least two nodes according to path loss information of each node in the uplink signal.

10. The method for selecting serving nodes for access according to claim 8, wherein selecting an uplink serving node from the at least two nodes according to each of the reference signal receiving parameters in the received uplink signal comprises one of:
- according to the reference signal receiving parameter of each node and transmit power of each node, obtaining path loss information corresponding to each of the nodes, and selecting a node of a smallest difference between the path loss information and a bias, which is a system parameter of the node, from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the corresponding to the second node; or
- according to the reference signal receiving parameter of each node and a bias of each of the nodes, selecting a node of a largest sum of the reference signal receiving parameter and the bias from all nodes as the uplink serving node, wherein the nodes comprise two types of nodes: first node and second node, the biases corresponding to all the first nodes are the same, the corresponding to all the second nodes are the same, and the bias corresponding to the first node is smaller than or equal to the bias corresponding to the second node.

11. The method for selecting serving nodes for access according to claim 9, wherein selecting an uplink serving node from the at least two nodes according to path loss information of each node in the uplink signal comprises:
- selecting a node of a smallest difference between the path loss information and a bias, which is a system parameter of the node, from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

12. The method for selecting serving nodes for access according to claim 7, wherein: the uplink signal is an uplink received signal sent by each of other nodes; and the receiving an uplink signal, and selecting an uplink serving node from at least two nodes according to the uplink signal comprise:
- receiving the uplink received signal sent by each of other nodes, wherein the uplink received signal carries a corresponding uplink signal receiving parameter that is obtained by each of other nodes according to an uplink signal sent by user equipment; and
- selecting an uplink serving node from the at least two nodes according to the uplink signal receiving parameter corresponding to each of the nodes.

13. The method for selecting serving nodes for access according to claim 12, wherein selecting an uplink serving node from the at least two nodes according to the uplink signal receiving parameter corresponding to each of the nodes comprises:
- selecting a node of a largest sum of the uplink signal receiving parameter and a bias, which is a system parameter of the node, from the nodes as the uplink serving node, wherein the nodes comprise two types of nodes: first node and second node, biases corresponding to all the first nodes are the same, the biases corresponding to all the second nodes are the same, and the bias corresponding to the first node is smaller than or equal to the bias corresponding to the second node.

14. The method for selecting serving nodes for access according to claim 7, wherein establishing a binding relationship with the uplink serving node comprises:
- sending a mapping relationship between a downlink serving node of the user equipment and the user equipment to the uplink serving node to establish a binding relationship with the uplink serving node.

15. A method for selecting serving nodes for access, comprising:
- receiving an uplink signal sent by user equipment after the user equipment has selected an uplink serving node; and
- establishing a binding relationship between a downlink serving node and the uplink serving node according to the uplink signal;
- wherein the uplink signal is used to enable the user equipment to be synchronized with the uplink serving node; and
- wherein the enabling the user equipment to be synchronized with the uplink serving node comprises:
- instructing the user equipment to send a specified uplink random access sequence in a specified random access resource, so that the uplink serving node detects an uplink synchronization offset of the user equipment, whereupon the user equipment corrects the uplink synchronization offset according to signaling sent by the downlink serving node to implement synchronization between the user equipment and the uplink serving node.

16. The method for selecting serving nodes for access according to claim 15, wherein receiving an uplink signal sent by the user equipment after the user equipment has selected an uplink serving node comprises one of:
- receiving, by the downlink serving node, an uplink signal which is sent by the user equipment and comprises an identifier of the uplink serving node; or
- receiving, by the uplink serving node, an uplink signal which is sent by the user equipment and comprises an identifier of the downlink serving node.

17. The method for selecting serving nodes for access according to claim 15, wherein the uplink serving node is different from the downlink serving node, and establishing a binding relationship between the downlink serving node and the uplink serving node comprises one of:
- sending, by the uplink serving node, a mapping relationship between the uplink serving node and the user equipment to the downlink serving node to establish a binding relationship between the downlink serving node and the uplink serving node; or
- sending, by the downlink serving node, a mapping relationship between the downlink serving node and the user equipment to the uplink serving node to establish a binding relationship between the downlink serving node and the uplink serving node.

18. A system comprising an apparatus for selecting serving nodes for access, user equipment and at least two nodes, wherein, the at least two nodes are configured to provide a downlink serving node and an uplink serving node for the apparatus for selecting serving nodes for access, and the apparatus for selecting serving nodes for access comprises:
- an obtaining module, configured to obtain reference signal receiving parameters of the at least two nodes, wherein the reference signal receiving parameters comprise reference signal received power or reference signal received quality;
- a downlink selecting module, configured to select a downlink serving node from the at least two nodes according to the reference signal receiving parameter of each of the nodes obtained by the obtaining module; and a sending module, configured to send an uplink signal, so that the downlink serving node selects an uplink serving node from the at least two nodes according to the uplink signal; or, configured to select an uplink serving node from the at least two nodes according to the reference signal receiving parameter of each of the nodes, and send an uplink signal, so that a binding relationship is established between the uplink serving node and the downlink serving node;

wherein the uplink signal is used to enable the user equipment to be synchronized with the uplink serving node; and wherein the enabling the user equipment to be synchronized with the uplink serving node comprises:

instructing the user equipment to send a specified uplink random access sequence in a specified random access resource, so that the uplink serving node detects an uplink synchronization offset of the user equipment, whereupon the user equipment corrects the uplink synchronization offset according to signaling sent by the downlink serving node to implement synchronization between the user equipment and the uplink serving node.

19. The system according to claim 18, wherein the sending module comprises:

a first parameter sending unit, configured to: according to an indication message sent by the downlink serving node, send an uplink signal comprising a reference signal receiving parameter of a node corresponding to the indication message to the downlink serving node, so that the downlink serving node selects an uplink serving node from the at least two nodes according to the reference signal receiving parameter of each node in the received uplink signal; and/or a second parameter sending unit, configured to: according to an indication message sent by the downlink serving node, send an uplink signal comprising path loss information of a node corresponding to the indication message to the downlink serving node, so that the downlink serving node selects an uplink serving node from the at least two nodes according to the path loss information of each node in the received uplink signal.

20. The system access according to claim 18, wherein the sending module comprises:

a first sending unit, configured to send an uplink signal for accessing the downlink serving node, so that each of the nodes except the downlink serving node sends an uplink signal receiving parameter corresponding to each of the nodes to the downlink serving node respectively according to the uplink signal and that the downlink serving node selects an uplink serving node from the at least two nodes according to the uplink signal receiving parameter corresponding to each of the nodes.

21. The system according to claim 18, wherein the sending module comprises:

an uplink selecting unit, configured to select an uplink serving node from the at least two nodes according to the reference signal receiving parameter of each of the nodes; and a second sending unit, configured to send an uplink signal comprising an identifier of the uplink serving node selected by the uplink selecting unit to the downlink serving node, so that a binding relationship is established between the uplink serving node and the downlink serving node; or, send an uplink signal comprising an identifier of the downlink serving node to the uplink serving node, so that a binding relationship is established between the uplink serving node and the downlink serving node.

22. The system according to claim 21, wherein the uplink selecting unit comprises at least one of:

a first subunit, configured to: according to the reference signal receiving parameter of each node and transmit power of each node, obtain path loss information corresponding to each of the nodes, and select a node of a smallest difference between the path loss information and a bias, which is a system parameter of the node, from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node; and a second subunit, configured to: according to the reference signal receiving parameter of each node and a bias of each of the nodes, select a node of a largest sum of the reference signal receiving parameter and the bias from all nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

23. The system according to claim 18, wherein the downlink selecting module is configured to:

select a node of a largest sum of the reference signal receiving parameter and a bias, which is a system parameter of the node, from the at least two nodes as the downlink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

24. A system comprising a downlink serving node, user equipment and an uplink serving node, wherein the downlink serving node comprises:

a first receiving module, configured to receive an uplink signal and select the uplink serving node from at least two nodes according to the uplink signal; and a first establishing module, configured to establish a binding relationship with the uplink serving node;

wherein the uplink signal is used to enable user equipment to be synchronized with the uplink serving node; and wherein the enabling the user equipment to be synchronized with the uplink serving node comprises:

instructing the user equipment to send a specified uplink random access sequence in a specified random access resource, so that the uplink serving node detects an uplink synchronization offset of the user equipment, whereupon the user equipment corrects the uplink synchronization offset according to signaling sent by the downlink serving node to implement synchronization between the user equipment and the uplink serving node.

25. The system according to claim 24, wherein the first receiving module comprises:

a first indication sending unit, configured to send an indication message to user equipment, and receive an uplink signal which is sent by the user equipment and comprises a reference signal receiving parameter of a node corresponding to the indication message; and a first uplink selecting unit, configured to select the uplink serving node from the at least two nodes according to each of the reference signal receiving parameters in the received uplink signal.

26. The system according to claim 24, wherein the first receiving module comprises:
a second indication sending unit, configured to send an indication message to user equipment, and receive an uplink signal which is sent by the user equipment and comprises path loss information of a node corresponding to the indication message; and
a second uplink selecting unit, configured to select the uplink serving node from the at least nodes according to path loss information of each node in the uplink signal.

27. The system according to claim 25, wherein the first uplink selecting unit comprises one of:
a third subunit, configured to: according to a reference signal receiving parameter of each node and transmit power of each node, obtain path loss information corresponding to each of the nodes, and select a node of a smallest difference between the path loss information and a bias, which is a system parameter of the node, from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node; and
a fourth subunit, configured to: according to the reference signal receiving parameter of each node and a bias of each of the nodes, select a node of a largest sum of the reference signal receiving parameter and the bias from all nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

28. The system according to claim 24, wherein the first receiving module comprises:
a third uplink selecting unit, configured to receive uplink signal receiving parameters sent by other nodes, wherein the uplink received signal carries corresponding uplink signal receiving parameters obtained by each of other nodes according to an uplink signal sent by user equipment, and select the uplink serving node from at least two nodes according to the uplink signal receiving parameter corresponding to each of the nodes.

29. The system according to claim 26, wherein the second uplink selecting unit is configured to:
select a node of a smallest difference between the path loss information and a bias, which is a system parameter of the node, from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

30. The system according to claim 25, wherein the third uplink selecting unit is configured to:
select a node of a largest sum of the uplink signal receiving parameter and a bias from the nodes as the uplink serving node, wherein the nodes comprise two types of nodes: first node and second node, the biases corresponding to all the first nodes are the same, the biases corresponding to all the second nodes are the same, and the bias corresponding to the first node is smaller than or equal to the bias corresponding to the second node.

31. The system according to claim 24, wherein the first establishing module is configured to send a mapping relationship between the node and the user equipment to the uplink serving node to establish a binding relationship with the uplink serving node.

32. A system comprising a node and user equipment, and an uplink serving node when the node is a downlink serving node, or, a downlink serving node when the node is an uplink serving node, wherein the node comprises:
a second receiving module, configured to receive an uplink signal sent by the user equipment after the user equipment has selected the uplink serving node; and
a second establishing module, configured to establish a binding relationship between the downlink serving node and the uplink serving node according to the uplink signal;
wherein the uplink signal is used to enable the user equipment to be synchronized with the uplink serving node; and
wherein the enabling the user equipment to be synchronized with the uplink serving node comprises:
instructing the user equipment to send a specified uplink random access sequence in a specified random access resource, so that the uplink serving node detects an uplink synchronization offset of the user equipment, whereupon the user equipment corrects the uplink synchronization offset according to signaling sent by the downlink serving node to implement synchronization between the user equipment and the uplink serving node.

33. The system according to claim 32, wherein the second receiving module is configured to: after the user equipment has selected the uplink serving node, when the node is the downlink serving node, receive an uplink signal which is sent by the user equipment and comprises an identifier of the uplink serving node, or when the node is the uplink serving node, receive an uplink signal which is sent by the user equipment and comprises an identifier of the downlink serving node.

34. The system according to claim 32, wherein the second establishing module comprises:
a first establishing unit, configured to: when the node is the uplink serving node, send a mapping relationship between the uplink serving node and the user equipment to the downlink serving node to establish a binding relationship between the downlink serving node and the uplink serving node; and
a second establishing unit, configured to: when the node is the downlink serving node, send a mapping relationship between the downlink serving node and the user equipment to the uplink serving node to establish a binding relationship between the downlink serving node and the uplink serving node.

35. A system for selecting serving nodes for access, comprising: an apparatus for selecting serving nodes for access and at least two nodes, wherein: the at least two nodes are configured to provide a downlink serving node and an uplink serving node for the apparatus for selecting serving nodes for access;
wherein the apparatus for selecting serving nodes for access comprises:
an obtaining module, configured to obtain reference signal receiving parameters of at least two nodes, wherein the reference signal receiving parameters comprise reference signal receiving power or reference signal receiving quality;
a downlink selecting module, configured to select a downlink serving node from the at least two nodes according to the reference signal receiving parameter of each of the nodes obtained by the obtaining module; and
a sending module, configured to send an uplink signal, so that the downlink serving node selects an uplink serving node from the at least two nodes according to the uplink signal; or, configured to select an uplink serving node from the at least two nodes according to the reference signal receiving parameter of each of the nodes, and send an uplink signal, so that a binding relationship is established between the uplink serving node and the downlink serving node; and
the node comprises:
a first receiving module, configured to receive an uplink signal and select an uplink serving node from at least two nodes according to the uplink signal; and
a first establishing module, configured to establish a binding relationship with the uplink serving node;
wherein the uplink signal is used to enable the apparatus for selecting serving nodes for access to be synchronized with the uplink serving node; and
wherein the enabling the apparatus for selecting serving nodes for access to be synchronized with the uplink serving node comprises:
instructing the apparatus for selecting serving nodes for access to send a specified uplink random access sequence in a specified random access resource, so that the uplink serving node detects an uplink synchronization offset of the apparatus for selecting serving nodes for access, whereupon the apparatus for selecting serving nodes for access corrects the uplink synchronization offset according to signaling sent by the downlink serving node to implement synchronization between the apparatus for selecting serving nodes for access and the uplink serving node.

36. A method for selecting serving nodes for access, comprising:
obtaining reference signal receiving parameters of at least two nodes, wherein the reference signal receiving parameters comprise reference signal receiving power or reference signal receiving quality;
selecting a downlink serving node from the at least two nodes according to the reference signal receiving parameter of each of the nodes; and
sending an uplink signal, so that the downlink serving node selects an uplink serving node from the at least two nodes according to the uplink signal and that user equipment (UE) is synchronized with the uplink serving node; or, selecting an uplink serving node from the at least two nodes according to the reference signal receiving parameter of each of the nodes, and sending an uplink signal, so that a binding relationship is established between the uplink serving node and the downlink serving node;
wherein the sending an uplink signal, so that the downlink serving node selects an uplink serving node from the at least two nodes according to the uplink signal and that the UE is synchronized with the uplink serving node, comprises one of:
according to an indication message sent by the downlink serving node, sending an uplink signal comprising a reference signal receiving parameter of a node corresponding to the indication message to the downlink serving node, so that the downlink serving node selects an uplink serving node from the at least two nodes according to the reference signal receiving parameter of each node in the received uplink signal and instructs the UE to send a specified uplink random access sequence in a specified random access resource and that the uplink serving node detects an uplink synchronization offset of the UE, whereupon the UE corrects the uplink synchronization offset according to signaling sent by the downlink serving node to implement synchronization between the UE and the uplink serving node; or
according to an indication message sent by the downlink serving node, sending an uplink signal comprising path loss information of a node corresponding to the indication message to the downlink serving node, so that the downlink serving node selects an uplink serving node from the at least two nodes according to the path loss information of each node in the received uplink signal and instructs the UE to send a specified uplink random access sequence in a specified random access resource and that the uplink serving node detects an uplink synchronization offset of the UE, whereupon the UE corrects the uplink synchronization offset according to signaling sent by the downlink serving node to implement synchronization between the UE and the uplink serving node.

37. A system comprising an apparatus for selecting serving nodes for access, user equipment (UE) and at least two nodes, wherein, the at least two nodes are configured to provide a downlink serving node and an uplink serving node for the apparatus for selecting serving nodes for access, wherein the apparatus for selecting serving nodes for access comprises:
an obtaining module, configured to obtain reference signal receiving parameters of the at least two nodes, wherein the reference signal receiving parameters comprise reference signal receiving power or reference signal receiving quality;
a downlink selecting module, configured to select a downlink serving node from the at least two nodes according to the reference signal receiving parameter of each of the nodes obtained by the obtaining module; and
a sending module, configured to send an uplink signal, so that the downlink serving node selects an uplink serving node from the at least two nodes according to the uplink signal and that the UE is synchronized with the uplink serving node; or, configured to select an uplink serving node from the at least two nodes according to the reference signal receiving parameter of each of the nodes, and send an uplink signal, so that a binding relationship is established between the uplink serving node and the downlink serving node;
wherein the sending module comprises at least one of:
a first parameter sending unit, configured to: according to an indication message sent by the downlink serving node, send an uplink signal comprising a reference signal receiving parameter of a node corresponding to the indication message to the downlink serving node, so that the downlink serving node selects the uplink serving node from the at least two nodes according to the reference signal receiving parameter of each node in the received uplink signal and instructs the UE to send a specified uplink random access sequence in a specified random access resource and that the uplink serving node detects an uplink synchronization offset of the UE, whereupon the UE corrects the uplink synchronization offset according to signaling sent by the downlink serving node to implement synchronization between the UE and the uplink serving node; and a second parameter sending unit, configured to: according to an indication message sent by the downlink serving node, send an uplink signal comprising path loss information of a node corresponding to the indication message to the downlink serving node, so that the downlink serving node selects the uplink serving node from the at least two nodes according to the path loss information of each node in the received uplink signal and instructs the UE to send a specified uplink random access sequence in a specified random access resource and that the uplink serving node detects an uplink synchronization offset of the UE, whereupon the UE corrects the uplink synchronization offset according to signaling sent by the downlink serving node to implement synchronization between the UE and the uplink serving node.

* * * * *